INVENTOR
JAMES E. LOVELOCK

United States Patent Office 3,725,009
Patented Apr. 3, 1973

3,725,009
DETECTION OF TRACE GASES UTILIZING AN ELECTRON CAPTURE DETECTOR
James Ephraim Lovelock, Bowerchalke, near Salisbury, England
Filed June 23, 1969, Ser. No. 835,346
Claims priority, application Great Britain, June 24, 1968, 30,079/68; June 4, 1969, 28,314/69
Int. Cl. G01n 23/12
U.S. Cl. 23—232 C                                                18 Claims

ABSTRACT OF THE DISCLOSURE

Method and apparatus for the detection of trace gases, such as for example atmospheric contaminants. A gas sample suspected of containing a contaminant is introduced into a reactor containing a reagent which converts the contaminant into an electron absorber. The presence of the contaminant is detected by passing the effluent from the reactor through an electron capture detector. If the gas sample contains oxygen then it is desirable to separate the oxygen from the stream entering the detector.

---

Figure 1:
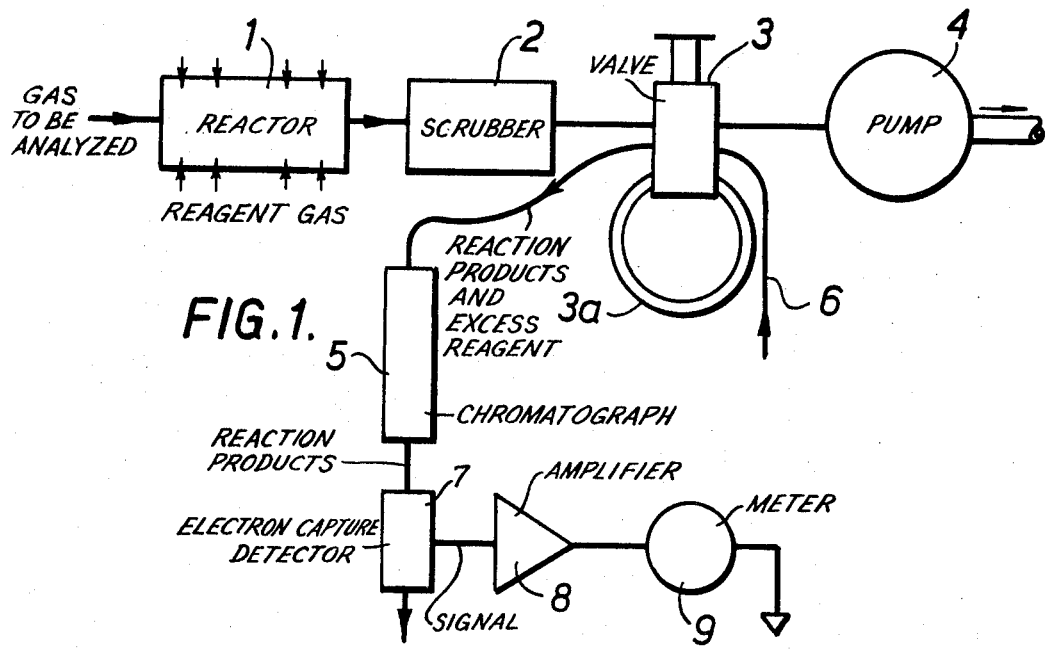

The present invention relates to a method and apparatus for detecting trace gases. The invention is applicable to the detection of very small concentrations of contaminants in a gas sample, it being possible to detect the presence of contaminants in concentrations as low as parts per $10^{10}$. A method and apparatus for the reliable detection of such contaminants as sulphur dioxide, hydrogen-sulphide and the oxides of nitrogen is desirable in view of possible toxic hazards resulting from their presence together with the introduction of legislation concerning atmospheric pollution.

According to one aspect of the present invention a method for detecting the presence of a contaminant in a gas sample comprises introducing the sample into a reactor containing reagent capable of converting the contaminant into a reaction product which is a strong electron absorber and thereafter introducing the reaction product into an electron capture detector to initiate a signal indicative of the presence of the contaminant in the sample.

When the gas sample contains or comprises oxygen, for example when the contaminant is present in the atmosphere it is desirable to nullify the effect of the oxygen on the electron capture detector. This is because oxygen itself is an electron absorber and at a 21% concentration in air hinders or prevents the direct measurement of the electron absorption of the trace gas when the latter is admitted into the detector.

The oxygen may be removed by passage through a chromatographic column prior to entry of the reaction products excess reagent and the carrier gas sample into the detector. The column separates the reaction product or products from the other constituents in the sample and excess reagent. Alternatively, the incoming gas sample containing the oxygen may be diluted with an inert gas, such as nitrogen, until the effect of the oxygen no longer prevents the efficient functioning of the electron capture detector. Yet again, the oxygen content in the gas sample may be removed by chemical or electrolytic means.

According to another aspect of the present invention an apparatus for detecting the presence of a contaminant in a gas sample comprises a reactor for conversion of the contaminant into an electron absorbing substance and an electron capture detector in communication with the reactor for indicating the presence of contaminant in the original sample. The apparatus may also comprise a chromatographic column included between the reactor and detector. The column separates the desired reaction product from other constituents and excess reagent.

For the detection of contaminants which are capable of reacting with surfaces such as those constituting the walls of the reactor and which are therefore likely to be lost before the reaction product can be formed, the reactor is preferably formed from a porous material and the reagent is introduced into the reactor as a gas through the porous walls, the sample being introduced from one end of the reactor. In this way the reagent channels incoming sample into a stream remote from the walls so as to prevent the loss of the contaminant by reaction with the walls.

The following table, gives examples of contaminants, reagents and the reaction products formed therefrom.

| Contaminant | Reagent | Reaction product (electron absorbing) |
|---|---|---|
| $SO_2$ | Solid Ag $F_2$, Co $F_3$ | $SO_2F_2$. |
| $H_2S$ | Gaseous $F_2$ $ClF_3$ | $SF_6$. |
| CO | Active nickel | $Ni(CO)_4$. |
| $C_2H_4$ | Gaseous $Cl_2$ | $C_2H_4Cl_2$ or $C_2H_4Br_2$. |
| $C_2H_2$ | $Br_2$ | $C_2H_2Cl_4$ or $C_2H_2Br_4$. |
| NO, $NO_2$ | Perfluoroamine salt | Perfluoro-alcohol. |
| $Cl_2$ | Ethylene | $C_2H_4Cl_2$. |
| $Br_2$ | Acetylene | $C_2H_2Br_4$. |

Examples of other reagents are fluorine, chlorine, bromine, bromine trifluoride $BrF_3$ and bromine pentafluoride $BrF_5$.

Thus, $H_2S$ by reaction with a fluorinating agent in the reactor can be converted to $SF_6$. $SF_6$ is a gas which is more readily separated by chromatographic means from other constituents of the atmosphere than $H_2S$ and is a strong electron absorber. Concentrations of $H_2S$ in the atmosphere as low as parts per $10^{10}$ can be detected.

Figure 2A:
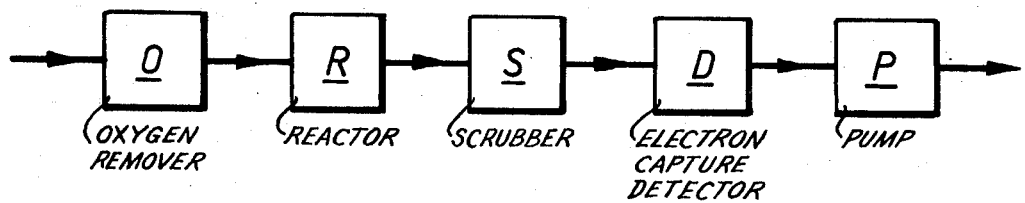
Figure 2B:
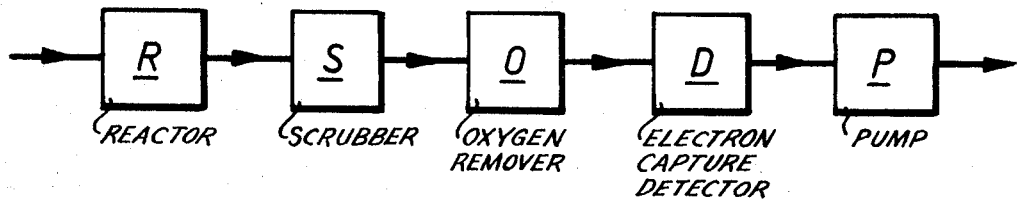

The invention will be described further, by way of example, with reference to the accompanying diagrammatic drawings, in which, FIG. 1 illustrates the inclusion of a chromatographic column between a reactor and a detector;

FIGS. 2a and 2b illustrate in block diagram two arrangements including an oxygen remover.

A reactor 1 is connected to a scrubber 2 which in turn is connected through a valve 3 to an air pump 4. The reactor can be formed from a tube of porous material which is inert to the reagent to be used in the reaction. Suitable reactor materials for use with fluorine and chlorine trifluoride reagents are porous nickel and polytetrafluoroethylene (P.T.F.E.). The reactor tube can be 0.1 to 1.0 cm. diameter and from 1 to 100 cm. in length. A gas to be analysed, i.e. a gas such as air suspected of containing a contaminant is drawn into the reactor by means of the pump 4. Reagent gas, capable of reacting with the suspected contaminant, is introduced into the reactor through the porous walls, as illustrated by the vertical arrows in FIG. 1. The air can be drawn through by the pump at flow rates of, for example, 1 to 1,000 ccs. per minute. Sufficient quantity of reagent gas is introduced into the reactor to provide an excess over the maximum amount of contaminant likely to be found in the air.

The reaction products, excess reagent and air are then drawn through the scrubber. The scrubber is advantageous for certain reactions, but is not necessary in all cases. Thus, for example, in the detection of traces of $H_2S$ in air using fluorine as the reagent, the excess fluorine and the undesired product HF can be removed from the desired $SF_6$ by passage through a bed of a material, such as stannous fluoride. The $SF_6$ is unaffected by passage through the scrubber.

The reaction products and excess reagent are drawn by the pump into a sample loop 3a of known volume. The valve 3 is then actuated to disconnect the loop from the pump 4 and to connect the loop into a carrier gas stream 6 which conveys the reaction products and reagent into a gas chromatograph column 5. The reaction products are separated from the excess reagent and from the oxygen of the air in the column before entering an electron capture detector 7. It is necessary to separate the reaction products from the atmospheric oxygen as the latter is itself an electron absorber. A short column of a solid adsorbant, such as alumina or silica gel is efficient in separating oxygen from $SO_2F_2$ and $SF_6$ and these two products from each other.

The reaction products, being strong electron absorbers are detected in the electron capture detector 7 and the resulting output signal from the detector is amplified by an electrometer 8 and noted on a meter 9.

The above method is particularly advantageous for detecting contaminants which are highly reactive and which could be lost by contact with the walls of the reactor before measurement could be effected. The directing of the reagent gas inwardly through the walls of the reactor prevents the contaminants from coming into contact with the walls and ensures that the reacion takes place substantially along the axis of the reactor.

FIGS. 2a and 2b illustrate apparatus for removing the oxygen content of the incoming gas sample and which dispenses with the use of a chromatographic column. In both FIGS. 2a and 2b, O represents an oxygen remover, R a reactor, S a scrubber, D an electron capture detector and P a pump. In FIG. 2a the oxygen remover is situated downstream of the reactor R whereas in FIG. 2b the oxygen remover is situated between the scrubber S and the detector D. Other arrangements of the components are possible. Thus if a long sample tube or probe is utilised for conveying a sample into the apparatus, FIG. 2a may be modified by locating the pump P downstream of the oxygen remover O and arranging that most of the sample drawn through the pump is exhausted directly to atmosphere with only a small portion being admitted to the reactor R, scrubber S and detector D.

The oxygen remover O is required to remove substantially all of the oxygen from the incoming air stream but not to remove any appreciable amount of trace gas. It is desirable that the volume of the air passage through the oxygen remover is not large compared to the volume of the detector. If this is not so, then the response of the detector will be slow or large volumes of air will have to be drawn through the detector.

The scrubber S removes any undesirable products from the treated air emerging from the oxygen remover. For example, where oxygen is removed by combination with hydrogen, two volumes of water vapour are formed for each volume of removed oxygen. Such water vapor could condense in the detector and impair its performance. The scrubber can also serve to remove contaminants which might give rise to a signal which would be confused with that of the tracer. In certain arrangements the scrubber can be formed integral with the oxygen remover. As with the oxygen remover, the scrubber volume is comparable to the volume of the detector.

The detector D is an electron capture detector, preferably having a volume, for example, between 50 to 500 microlitres. With such a volume, the quantity of air from which oxygen is removed need not be too great for the capacity of the oxygen remover at a response time of not more than a few seconds.

Examples of oxygen removers are chemical removers, palladium tube removers, and electrolytic cell removers.

Chemical removers can take the form of disposable hollow cartridges filled with a material capable of removing oxygen from the air. Suitable materials are finely divided copper, solutions of pyrogallol or sodium hydrosulphite in an alkaline medium or other known oxygen liquid absorbents supported upon an absorbent solid powder. An indication of when the remover is spent is given by a decrease in the current flow of the electron capture detector.

Palladium tube oxygen removers comprise a thin walled palladium tube surrounded externally by hydrogen or a hydrogen generating environment such as the cathode of an electrolytic cell. The oxygen is removed up to some limiting flow rate determined by the dimensions and temperature of the palladium tube. Thus, 15 cms. of palladium silver alloy tube having a diameter of 0.01 inch and a wall thickness of 0.005 inch can remove all oxygen from a flow of 50 ml. of air per minute at 400° C. Tracer gases, such as sulphur hexafluoride are not removed until much higher temperatures are reached. A water condenser is inserted between the palladium tube and the detector as water formation is a product of the oxygen removal.

In an electrolytic cell remover, the cathode of an air battery comprises the oxygen remover. The cell can be utilised to power the pump and the electronic components of the detector. The air electrode comprises a porous conducting metal catalyst in contact with an alkaline solution, e.g. saturated potassium carbonate. The air electrode can serve as a combined oxygen remover and scrubber. In place of a battery, the electrode can form part of an electrolytic cell driven by an external electrical power source so that oxygen is removed from the air at the cathode and discharged at the anode. Such a cell is capable of long life.

As an alternative to the use of an oxygen remover, the undesirable effect of oxygen in a gas sample can be nullified by dilution of the sample entering the apparatus with nitrogen. In such an arrangement the oxygen remover shown in FIG. 2a is omitted and an excess of nitrogen is admitted into the sample downstream of the reactor.

The invention is also applicable to the detection of contaminants which are not susceptible to reaction with the walls of a containing vessel, and where the conversion reaction or the electron absorbing product is destroyed by reaction with other components of the original gas; such as, for example, oxygen in air. A typical example of such a contaminant is carbon monoxide, an inert gas which does not give rise to surface reaction problems.

Carbon monoxide can be converted into nickel tetracarbonyl which is an intensely electron absorbing substance. However, nickel tetracarbonyl is unstable and rapidly decomposed by atmospheric oxygen.

In this case a known volume of air to be analysed may be introduced into an inert carrier stream, for example, an argon, methane, hydrogen stream or a stream of nitrogen and hydrogen. The carrier stream carrying the sample is then introduced into a short column of molecular sieve. At the moment of introducing the sample into the carrier stream the exit port of the chromatographic column is connected to atmosphere and remains so connected until the oxygen peak has traversed the column. The flow is then transferred into a reactor containing activated nickel at 40° C. and then directly into the detector. By this means the reaction in the reactor occurs in a substantially oxygen free atmosphere and hence results in efficient conversion of the carbon monoxide into nickel carbonyl.

Alternatively, the oxygen content of the air is removed prior to entry into the reactor by means of oxygen removers as previously described.

An electron capture detector generally comprises an ionization chamber having parallel plates and containing tritium as the primary source of ionizing radiation. Upon entry into the chamber of a carrier gas possessing no affinity for electrons, recombination of positive ions and free electrons is unlikely to take place because of the free electrons high mobility. Thus by applying a small potential across the chamber all ions formed by the ionizing radiation can be collected. When the carrier gas contains a compound having an affinity for electrons, negative ion formation occurs which is accompanied by an observed decrease in current.

I claim:

1. A method of directly monitoring an atmosphere for the presence of a contaminant, comprising introducing a sample of the atmosphere into a reactor containing reagent capable of converting the contaminant into a reaction product which is a strong electron absorber and thereafter passing the reaction product into an electron capture detector to initiate a signal indicative of the presence of the contaminant in the sample.

2. A method as claimed in claim 1 which comprises diluting the gas sample entering the reactor with nitrogen.

3. A method as claimed in claim 1 in which the reagent comprises at least one member taken from the group comprising fluorine, chlorine, bromine, chlorine trifluoride, bromine trifluoride, bromine pentafluoride, solid silver fluoride, cobalt trifluoride, active nickel, perfluoroamine salt, ethylene and acetylene.

4. A method as claimed in claim 1 which comprises removing undesirable constituents from the products emerging from the reactor prior to their introduction into the detector.

5. A method as claimed in claim 1 which comprises separating oxygen from the sample prior to entry into the detector.

6. A method as claimed in claim 5 which comprises separating oxygen from the sample prior to the introduction of the sample into the reactor.

7. A method as claimed in claim 5 which comprises separating the oxygen by chemical means.

8. A method as claimed in claim 5 which comprises separating the oxygen by electrolytic means.

9. A method as claimed in claim 5 which comprises separating the oxygen by passing the reaction product and sample through a chromatographic column located between the reactor and the detector.

10. A method for detecting the presence of a contaminant in a gas sample which comprises introducing the sample into a reactor containing reagent capable of converting the contaminant into a reaction product which is a strong electron absorber, maintaining the gas sample out of contact with the walls of the reactor, and thereafter introducing the reaction product into an electron capture detector to initiate a signal indicative of the presence of the contaminant in the sample.

11. An apparatus to directly monitor an atmosphere for the presence of a contaminant, comprising a reactor for conversion of the contaminant in a sample of the atmosphere into an electron absorbing material, an electron capture detector in communication with the reactor for indicating the presence of contaminant in the gas sample, pump means for continuously drawing the sample through the reactor, and means for introducing at least a portion of the sample drawn by the pump means into the electron capture detector.

12. An apparatus as claimed in claim 11 including a scrubber located intermediate the reactor and the detector for the removal of undesirable constituents prior to entry into the detector.

13. An apparatus as claimed in claim 11 including means for the removal of oxygen from the gas sample prior to entry into the detector.

14. An apparatus as claimed in claim 13 in which the oxygen removal means is located upstream of the reactor.

15. An apparatus as claimed in claim 13 in which the oxygen removal means comprises one of a group comprising finely divided copper, a solution of pyrogallol in an alkaline medium, a solution of sodium hydrosulphite in an alkaline medium and a palladium tube.

16. An apparatus as claimed in claim 13 in which the oxygen removal means comprises an electrolytic cell.

17. An apparatus as claimed in claim 13 in which the oxygen removal means comprises a chromatographic column located intermediate the reactor and the detector.

18. An apparatus for detecting the presence of a contaminant in a gas sample, comprising a reactor for conversion of the contaminant into an electron absorbing material, the reactor comprising a hollow body having porous walls, means for introducing a reagent through the porous walls into contact with the gas sample flowing into one end of the reactor, and an electron capture detector in communication with the reactor for indicating the presence of the contaminant in a gas sample.

References Cited

Lovelock et al.: J. Amer. Chem. Soc. 82, 431 (1960).
Devaux et al.: Chem. Abstr. 65, 11321d (1966).
Lovelock, J. E.: Anal. Chem. 33, No. 2, February 1961, pp. 171, 172.
Chemical & Engineering News, Aug. 12, 1963, p. 38, vol. 41, No. 32.

MORRIS O. WOLK, Primary Examiner

ROBERT M. REESE, Assistant Examiner

U.S. Cl. X.R.

23—232 E, 254 E; 250—83, 6 R